United States Patent
Sogou et al.

(10) Patent No.: US 9,516,856 B2
(45) Date of Patent: Dec. 13, 2016

(54) METHOD FOR PRODUCING ANIMAL LITTER SAND

(71) Applicant: UNI-CHARM CORPORATION, Ehime (JP)

(72) Inventors: Tatsuya Sogou, Kagawa (JP); Takayuki Matsuo, Kagawa (JP)

(73) Assignee: Unicharm Corporation, Ehime (JP)

( * ) Notice: Subject to any disclaimer, the term of this patent is extended or adjusted under 35 U.S.C. 154(b) by 3 days.

(21) Appl. No.: 14/387,498

(22) PCT Filed: Mar. 21, 2013

(86) PCT No.: PCT/JP2013/058170
§ 371 (c)(1),
(2) Date: Sep. 23, 2014

(87) PCT Pub. No.: WO2013/146552
PCT Pub. Date: Oct. 3, 2013

(65) Prior Publication Data
US 2015/0048538 A1    Feb. 19, 2015

(30) Foreign Application Priority Data
Mar. 29, 2012 (JP) .................. 2012-078019

(51) Int. Cl.
| A01K 1/015 | (2006.01) |
| A01K 1/01 | (2006.01) |
| B27N 1/00 | (2006.01) |

(52) U.S. Cl.
CPC ........... *A01K 1/0152* (2013.01); *A01K 1/0107* (2013.01); *A01K 1/0154* (2013.01); *A01K 1/0155* (2013.01); *B27N 1/00* (2013.01)

(58) Field of Classification Search
None
See application file for complete search history.

(56) References Cited

U.S. PATENT DOCUMENTS

| 5,207,830 A | * | 5/1993 | Cowan ................ A01K 1/0154 106/672 |
| 5,648,306 A | | 7/1997 | Hähn et al. |
| 2009/0211532 A1 | * | 8/2009 | Matsuo ................ A01K 1/0154 119/173 |
| 2011/0017143 A1 | | 1/2011 | Matsuo et al. |

FOREIGN PATENT DOCUMENTS

| EP | 0 572 702 A1 | 6/1992 |
| EP | 2 241 178 A1 | 4/2009 |

(Continued)

OTHER PUBLICATIONS

International Search Report from corresponding PCT application No. PCT/JP2013/058190 dated Jun. 25, 2013.

(Continued)

*Primary Examiner* — Mary F Theisen
(74) *Attorney, Agent, or Firm* — Brinks Gilson & Lione

(57) ABSTRACT

An animal litter sand that effectively prevents scattering of particles without increasing the weight or density of the litter sand. The animal litter sand is prepared by forming particles by a step that adds water and mixes together at least a particulate substrate from an inorganic material, a hydraulic solidification material, and a water-soluble thickener.

13 Claims, 1 Drawing Sheet

(56) References Cited

FOREIGN PATENT DOCUMENTS

| JP | 2006-246797 A | 9/2006 |
| JP | 2008-193938 A | 8/2008 |
| JP | 2009-125000 A | 6/2009 |

OTHER PUBLICATIONS

European extended Search Report from corresponding European application No. 13770176.9 darted Nov. 11, 2015 (6 pgs).
International Preliminary Report on Patentability and Written Opinion from corresponding PCT application No. PCT/JP2013/058170, dated Oct. 1, 2014 (7 pgs).
European Communication from corresponding European application No. 13770176.9 dated Sep. 21, 2016 (5 pgs).

* cited by examiner

METHOD FOR PRODUCING ANIMAL LITTER SAND

RELATED APPLICATIONS

This application is a 35 U.S.C. §371 national phase filing of International Patent Application No. PCT/JP2013/058170, filed Mar. 21, 2013, through which and to which priority is claimed under 35 U.S.C. §119 to Japanese Patent Application No. 2012-078019, filed Mar. 29, 2012.

FIELD OF THE INVENTION

The present invention relates to a method of manufacturing animal litter for use in a litter box for animals such as cats and dogs.

BACKGROUND OF THE INVENTION

Japanese laid-open Patent Publication No. 2009-125000 (Patent Document 1) discloses animal litter which comprises a plurality of granules, each having an inorganic porous material, silica gel and a hydraulic inorganic binder for integrally binding them.

It is known that indoor animals, particularly cats have a habit of burying their own excrement in sand or pawing animal litter after excretion in a litter box ("sand pawing").

In order to prevent the granules from easily scattering away from the litter box during the sand pawing, conventionally, in manufacturing animal litter, an inorganic porous material, silica gel and a hydraulic inorganic binder are mixed and granulated while water is added, and in this process, pressure is applied to the mixture dissolved in water until the binder is hardened. In this manner, granules having relatively high density can be formed, so that the animal litter can be provided in which the granules do not easily scatter away even by the sand pawing.

By thus continuing to apply strong pressure to the mixture dissolved in water during the time required for the binder to be hardened, the shape retentively of the granules can be secured. In such a case, the weight of the granules increases and accordingly the effect of preventing the granules from scattering away can be obtained. However, the density of the granules of the animal litter increases and thus the weight of the granules unnecessarily increases, which causes various problems such as the waste of materials and suppression of the cost reducing effect.

Patent Document 1: Japanese laid-open Patent Publication No. 2009-125000

DISCLOSURE OF THE INVENTION

Object of the Invention

Accordingly, it is an object of the present invention to provide a technique for effectively preventing granules of animal litter from scattering away without unnecessary increase of its weight in manufacturing animal litter.

Invention to Achieve the Object

The above-described problem is solved by the present invention as defined in claims. A method of manufacturing animal litter according to this invention is provided to obtain animal litter including an aggregate of granules and includes at least a step of forming the granules by mixing a granular substrate made of inorganic porous material, a hydraulic binder and a soluble thickener while adding water.

The method of manufacturing animal litter preferably includes a step of obtaining a granular mixture by mixing and stirring the granular substrate, the binder and the thickener while adding water, a step of curing and solidifying the mixture via the binder, and a step of obtaining the granules by drying the solidified mixture. The step of obtaining the granular mixture includes both the manner of obtaining the granular mixture by mixing and stirring the granular substrate, the binder and the thickener while adding water, and the manner of obtaining the granular mixture by performing a predetermined compression granulating process after mixing and stirring the granular substrate, the binder and the thickener while adding water.

In the animal litter manufacturing method, the thickener is preferably water-soluble cellulose or modified cellulose.

In the animal litter manufacturing method, the thickener is preferably at least one of alkyl cellulose and hydroxyl cellulose.

In the animal litter manufacturing method, the granular substrate is preferably a zeolitic material. A bentonitic material may also be used.

In the animal litter manufacturing method, the binder is preferably a cementitious binder.

In the animal litter manufacturing method, the weight of each granule is preferably about 0.1 to 0.4 gram.

In the animal litter manufacturing method, the length of each granule is preferably about 5 to 20 mm.

In the animal litter manufacturing method, the diameter of each granule is preferably about 3 to 8 mm.

In the animal litter manufacturing method, preferably, a silica gel material is further mixed as a deodorant.

Further, in the animal litter manufacturing method, preferably, the granules are water-repellent.

In the animal litter manufacturing method, preferably, the granule contains the binder of about 20% or less by mass and the thickener of about 1% or less by mass.

Further, in the animal litter manufacturing method, preferably, the granule includes a granular substrate made of inorganic porous material, a hydraulic binder and a soluble thickener, and has the average granule density from about 0.0010 to 0.0012 $g/mm^3$.

Effect of the Invention

According to this invention, a method of manufacturing animal litter is provided which can effectively prevent granules forming the animal litter from scattering away without unnecessary increase of its weight.

REPRESENTATIVE EMBODIMENT OF THE INVENTION

Figure 1:
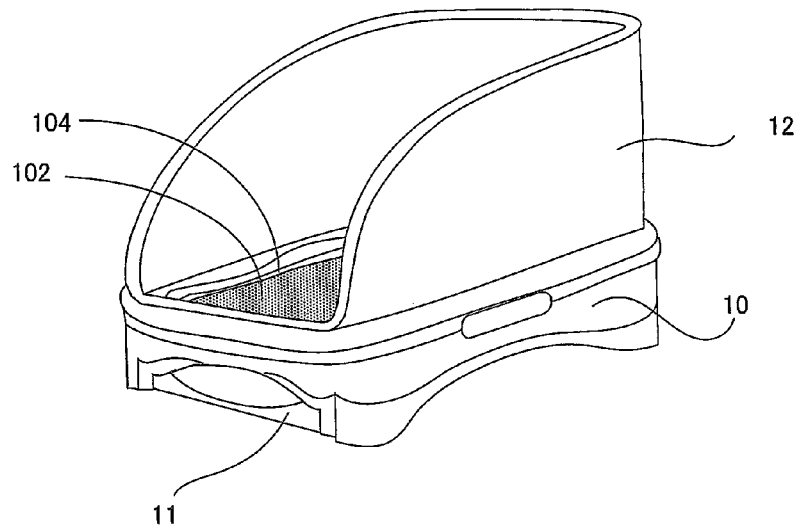
FIG. 1 is a perspective view showing an animal litter box using animal litter manufactured by a method of manufacturing animal litter according to an embodiment of the present invention.

The present invention is described below based on a preferred embodiment.

This embodiment relates to a method of manufacturing animal litter including an aggregate of granules. Each of the granules includes a granular substrate made of inorganic porous material, a hydraulic binder and a soluble thickener.

The "aggregate of granules" forming the animal litter in this invention particularly serves to suppress odors of animal excrement while allowing passage of liquid of the excrement, and is mainly formed of a granular substrate made of inorganic porous material.

One or more materials such as zeolite, bentonite, sepiolite, attapulgite, diatomite and diatomaceous shale may be appropriately selected for use as the "inorganic porous material" forming the granular substrate. In this invention, by using the inorganic porous material to form a main component element of the granule, or the granular substrate, animal litter having excellent deodorizing ability can be provided.

It is preferable that the granular substrate in this invention is particularly formed of zeolitic material. Zeolitic material mainly consists of a kind of clay, so that it has excellent absorptive property, cation exchange ability or deodorizing ability, and appropriate flexibility as an excretion bed.

Preferably, the content of the granular substrate in this invention is appropriately selected to be about 50 to 95% by mass, and more preferably 70 to 90% by mass. If the content of the granular substrate is less than 50% by mass, the deodorizing effect of the granules may decrease. Further, if the content of the granular substrate is more than 95% by mass, the strength of the granules may decrease. In one of the preferred embodiments of the present invention, granules containing about 74 to 75% by mass of zeolite are used as the granular substrate.

The "hydraulicity" of the binder in this invention means that the binder reacts with water to be hardened and provided with a strength and, even if water is further added to it thereafter, the strength is not reduced. It is preferable that the "hydraulic binder" used here is an inorganic hydraulic solidifacation material, and typically formed of cementitious material, or of non-cementitious material or by addition of non-cementitious material to cementitious material. The "cementitious material" in this invention is formed as a binder which has a main component of calcium silicate and is hardened by hydration reaction. For example, Portland cement or white cement may be used.

Further, it is preferable that low-alkali cement is used for the binder in order to decrease the pH levels of the binder and thus the granules. The low-alkali cement is prepared such that alkali metal (Na, K) content in the cement is lower than a predetermined content. The use of the low-alkali cement allows decrease of the pH levels of the entire granules containing the binder. Therefore, it can contribute to reduction of physical burden for animals using the litter box, and also contribute to suppression of ammonia evolution from animal excrement.

The "non-cementitious material" in this invention refers to a binder other than cement, that is, a binder having a main component other than calcium silicate. For example, one or more materials such as dolomite, calcium oxide, calcium sulfate and magnesium oxide may be appropriately selected. Particularly, a hydraulic binder mainly containing calcium sulfate and magnesium oxide is generally neutral, and magnesium hydrate which is generated when the binder is hardened is weakly basic. In this case, the effect of reducing the pH levels or the effect of suppressing ammonia evolution can be improved.

The content of the binder in the granules in this invention is preferably 5 to 30% by mass, and more preferably 10 to 20% by mass. If the overall binder content is less than 5% by mass, the granules may not obtain sufficient strength. Further, if the overall binder content is more than 30% by mass, the deodorizing effect of the granules may decrease. Moreover, when an inorganic binder is used as the binder, the cement content is preferably more than 40% by mass, and more preferably more than 50% by mass. If the cement content is less than 40% by mass, the granules may not obtain sufficient strength.

In the binder which mainly contains calcium sulfate and magnesium oxide, the calcium sulfate content is preferably from 50 to 95% by mass, and the magnesium oxide content is preferably from 5 to 50% by mass. It is noted here that the calcium sulfate content is expressed in terms of the content of anhydride.

In this invention, the hydraulic binder which mainly contains calcium sulfate and magnesium oxide may also contain other components, such as hardening accelerators and other metal oxides. The hardening accelerators include chlorides of barium, magnesium, calcium, sodium, potassium, phosphorus or the like, and inorganic salts such as nitrate, nitrite, sulfate and sulfite. The other metal oxides include oxides of barium, calcium, sodium, potassium, phosphorus, aluminum, silicon, iron or the like. In the hydraulic binder which mainly contains calcium sulfate and magnesium oxide, the content of the other components is preferably less than 20% by mass, and more preferably less than 10% by mass.

The "thickener" in this invention refers to a material which is capable of increasing the viscosity of the granular substrate and the hydraulic binder which are dissolved in water while water is added. For example, one or more materials such as cellulosic thickener, starch thickener, inorganic thickener and gum can be appropriately selected and used.

Particularly in this invention, preferably, the thickener is made of water-soluble cellulose or modified cellulose, or of at least one of alkyl cellulose and hydroxyl cellulose. It is preferable for the thickener to have a viscosity of at least 2,000 mpa·s (megapascal·second). In one embodiment of this invention, for example, alkyl cellulose is used as the thickener.

The molecular weight of the cellulose thickener in this invention can be variously set, but in any case, it is preferred that the thickener has a viscosity high enough to prevent formation of granules having unnecessarily high density.

The granules of this invention are formed of the granular substrate as a main component with addition of the binder and the thickener. This addition is preferably made in the process of forming the granules by mixing and stirring the granular substrate, the binder and the thickener while adding water. As a result, the animal litter is formed of the granular substrate as a main component with addition of the binder and the thickener. This manner of forming the granules includes both the manner of obtaining a granular mixture by mixing and stirring, where the mixing and stirring simultaneously involves granulating, and the manner of obtaining a granular mixture by performing a predetermined compression granulating process after mixing and stirring.

According to the above-described method of manufacturing the animal litter, in manufacturing the animal litter, when water is added, during the time required for the hydraulic binder to solidify the granular substrate, the soluble thickener increases the viscosity of the granules dissolved in water. Thus the shape retentively of the granules can be secured. Therefore, the animal litter is provided which can effectively prevent scattering of the granules which is caused by a sand pawing behavior of an animal while the weight and the density of the granules or an aggregate of granules are set in appropriate ranges.

In a further preferred embodiment of the present invention, the binder is a cementitious binder.

In a further preferred embodiment of the present invention, the weight of each granule is about 0.1 to 0.4 gram.

In a further preferred embodiment of the present invention, the length of each granule is about 5 to 20 mm, and the diameter of each granule is about 3 to 8 mm. If each granule is too short, the granules may be caught in the body of the animal, such as a paw, which results in promoting scattering of the granules. On the other hand, if each granule is too long, the granules may become so big in appearance that the animal tends to dislike excreting on them. According to this invention, the length of each granule is set in an optimum range, so that these problems can be eliminated. Further, the same holds for the diameter of each granule. If the diameter of each granule is too small, the granules may be caught in the body of the animal, such as a paw, which results in promoting scattering of the granules. On the other hand, if the granule diameter is too big, the granules may become so big in appearance that the animal tends to dislike excreting on them.

In a further preferred embodiment of the present invention, the animal litter includes a silica gel material as a deodorant. The silica gel material has a relatively wide surface area compared with its mass due to its porous structure, so that it has excellent performance of absorbing excrement and excellent ability of deodorizing ammonia or other odors and excellent performance of continuously maintaining the deodorizing ability.

In this invention, any of A-type silica gel, B-type silica gel and C-type silica gel may be used as the silica gel. Particularly, C-type silica gel is preferably used because it has many pores and excellent absorption capacity of water and ammonia. In this invention, preferably, the content of silica gel in the granules is about 5% by mass. If the content of silica gel is too low, the deodorizing ability may decrease. On the other hand, if the content of silica gel is too high, the deodorizing ability may increase, but the strength of the granules may decrease.

Further, in this invention, preferably, the granules may be formed to contain the binder of about 20% or less by mass and the thickener of about 1% or less by mass.

For example, the animal litter contains the granular substrate of 74.8% by mass, the binder of 20% by mass, silica gel of 5% by mass and cellulosic thickener of 0.2% by mass. If the content of the binder is too low, the strength of the granules may decrease. Thus, the granules may frequently get broken during use and thus scatter in powdered form, or may clog the net of the litter box. On the other hand, if the content of the binder is too high, the contents of the granular substrate and the deodorizing materials such as silica gel relatively decrease, so that the deodorizing ability may decrease.

In this invention, preferably, the granules are water-repellent, so that the fluid penetration of the granules improves. Further, fluid such as urine is not easily absorbed into the granules, so that the life of the granules can be extended. Further, the amount of fluid remaining in the granules can be reduced, so that evolution of odor can be reduced.

The water-repellent treatment may be performed, for example, by spraying and coating a water-repellent agent on the surface of the granules. Wax resin such as paraffin wax, silicon resin, fluorine resin or the like may be used as the water-repellent agent.

When coating the water-repellent agent on the surface of the granules, the amount of coating is preferably from 0.05 to 1% by mass, and more preferably 0.1 to 0.5% by mass, with respect to the mass of the granules.

Further, the granules of this invention preferably contain fragrance. The masking effect of the fragrance allows for suppression of the odor of urine, feces and the like. A type of alcohol such as geraniol, citronellol, citral, eugenol, phenethyl alcohol, thymol, linalool, leaf alcohol, menthol and benzyl alcohol, and a type of aldehyde such as hexyl-cinnamaldehyde are favorably used as the fragrance.

The granules of this invention can have a spherical, cylindrical or other appropriately selected shape, however it is preferable to form them in a cylindrical shape in light of preventing scattering of the granules during use as much as possible.

The granules of this invention can be formed, for example, by using a disk pelleter, a briquette machine or a tableting machine. Particularly, the disk pelleter is preferably used.

When the granules are formed into a cylindrical shape, the average diameter of the granules (the diameter of the bottom of the cylindrical shape) is preferably from 3 to 8 mm, and the average length of the granules (the height of the cylindrical shape) is preferably from 5 to 20 mm.

In this case, the average diameter of the granules is determined by measuring the diameters of twenty granules and taking the average value thereof. The average length of the granules is determined by measuring the lengths of fifty granules and taking the average value thereof.

It is preferable that the average pH level of the granules in this invention is 12 or less. With such a construction, the burden to the legs or other body part of animals can be reduced, and ammonia evolution can be suppressed.

The average pH level of the granules can be measured according to the following pH level measuring method.
(pH Level Measuring Method)

The granules are crushed into pieces, sieved using a 80-mesh sieve, and the pieces that pass through the sieve are used as specimens.

2.5 ml of distilled water is dripped per one gram of each specimen, slightly stirred and then left for 30 minutes. Then the pH levels of the specimens are measured using a pH meter (Skincheck manufactured by HANNA Instruments).

The average strength of the granules in this invention is preferably 30 N or more, and more preferably 50 N or more. If the average strength is less than 30 N, the granules may break during use, making it easier for the litter to scatter.

The average strength of the granules is measured according to the following granule strength measuring method.
(Granule Strength Measuring Method)

Granules left at room temperature of 25° C. and humidity of 60% for 24 hours or more are used as specimens.

The specimen of the granules is placed on a measuring table of a manual handle-type digital force gauge stand (manufactured by NIDEC-SHIMPO Corporation, FGS-50H).

A digital force gauge (manufactured by NIDEC-SHIMPO Corporation, FGN-50B) is attached to the digital force gauge stand, and set such that the tip of a measurement adapter (cylindrical shape: 10 mm in diameter) is in contact with the granule.

The handle is turned slowly by hand, and the granules are compressed by the measurement adapter. The force by which the granule breaks is determined as a granule strength measurement value.

Measurement is carried out on ten granules, and the average value thereof is determined as the average granule strength.

In the case of cylindrically-shaped granules, in measurement of the granule strength, the tip of the measurement adapter is placed perpendicular to the height direction of the granule in contact with the granule.

In relation to the animal litter as described above, preferably, an animal litter box is provided having at least an animal litter container and an absorbent sheet container arranged under the animal litter container, and the above-described animal litter is put in the animal litter container. In the animal litter box having such a construction, the animal litter having appropriate weight and density while effectively prevented from scattering is used, so that usability of the animal litter box can be improved.

A preferred method for manufacturing animal litter according to this invention is now described.

The granule forming the litter of this invention is formed from a mixture including an inorganic porous granular substrate, silica gel, a binder and a thickener. First, the granular substrate, the silica gel, the binder and the thickener are mixed in a predetermined proportion, water is added, and then the mixture is stirred and mixed uniformly using a mixer in such a manner as to avoid clumping.

Next, the mixture obtained by the stirring and mixing as described above is granulated. This granulation in this invention is made by using a granulator for various granules such as a disk pelleter, a briquette machine and a tableting machine. In this embodiment, the process of obtaining the mixture by stirring and mixing and the process of granulating the mixture are separately performed, but the granulating process may be simultaneously performed in the stirring and mixing process.

The resulting granular mixture is then left for a predetermined time in order to accelerate solidification of the inorganic binder. This step is referred to as a curing step. The curing time is preferably 72 hours or more in light of sufficient solidification of the inorganic binder, although it differs according to temperature.

Subsequently, the sufficiently solidified granules are dried using a dryer such as a rotary kiln dryer. The granules are preferably dried such that the moisture percentage of the granules is 10% or less.

For measurement of the moisture percentage, the dried granules are further dried for 24 hours at 110° C. The difference in mass of the granules before and after the second drying is taken as the moisture amount, and the moisture percentage is obtained by dividing the moisture amount by the mass of the granules which are not yet subjected to the second drying. Large and small granules are removed in a sieving step in order to obtain granules of a predetermined size. The animal litter of this invention is manufactured in this manner.

The animal litter of this invention has high fluid penetration rate, so that it is favorably used particularly for an animal litter box of an overlap structure type in which litter is put, directly or via a drainboard or the like, on an absorbent sheet for absorbing fluid such as urine.

Representative Example

This invention is now described in further detail below while referring to a working example.

(1) Step of Mixing and Granulating Raw Materials for Granules

Zeolite powder (product of Ayashi, Miyagi Prefecture, 60-mesh pass product, average particle diameter of 150 μm, moisture of 7% or less) of 69.8% by mass, white cement (manufactured by Taiheiyo Cement Corporation) of 20% by mass, C-type silica gel (product of Qingdao, China) of 10% by mass, and modified cellulose of 0.2% by mass are mixed, followed by adding water of 50% by mass, and then stirred and mixed using a loedige mixer.

The stirred and mixed mixture is granulated by compressing using a disk peletter (manufactured by Dalton, Co., Ltd.). The disk has an outlet opening of 5.5 mm in diameter, and is 35 mm in thickness and 12 mm in effective length. In this granulating process, the modified cellulose serves as a thickener in the mixture dissolved in water. In this embodiment, it has a viscosity of 4,000 mpa·s (megapascal·second). Therefore, even in a stage prior to final solidification of cement in the curing process as described below, or in a stage in which the mixture is dissolved in water and not sufficiently solidified yet, the high shape-retentively of the mixture is secured by this thickening effect, so that the granulation can be achieved without applying strong compressing force. The resulting granular mixture is 5.5 mm in diameter and 25 mm in average particle length.

(2) Curing Step

The resulting granules are left for 72 hours at a room temperature of 20° C. to accelerate solidification of cement.

(3) Drying Step

The granules subjected to the curing step are dried by using a rotary kiln dryer until the final moisture percentage is 10% or less. In the drying step, the granules contract, and some of them get broken. As a result, the granules obtained after the drying step are 5.5 mm in diameter and 9 mm in average particle length.

(4) Water-Repellent Agent Coating Step

Wax resin (manufactured by Nicca Chemical Co., Ltd., TH-44) is used as a water-repellent agent. A solution of the water-repellent agent diluted 50 times with water is coated to be 10% by mass with respect to the mass of the granules. The coating is performed by spraying the water-repellent agent solution while stirring and mixing the granules.

(5) Sifting Step

The resulting granules are sifted through a sieve with a 10 mm×10 mm mesh to remove granules larger than a predetermined size, and then sifted through a sieve with a 5 mm×10 mm mesh to remove granules and powders smaller than a predetermined size. Thus, granules having a size within a predetermined range are obtained.

Comparative Example

For comparison with the granules in the above-described working example, granules having the same composition as the above-described working example except that the thickener is not added are used for comparative evaluation.

The average weight (and density) of the granules of the animal litter obtained in the working example and the comparative example is measured.

In the working example, the granules have the average weight of 0.28 gram and the average density of 0.0011 g/mm$^3$.

In the comparative example, the granules have the average weight of 0.32 gram and the average density of 0.0014 g/mm$^3$.

As clearly understood from these results, in this working example, use of the thickener has the effect of decreasing the weight and density of each granule, so that unnecessary increase of the weight and density can be effectively avoided.

Figure 2:
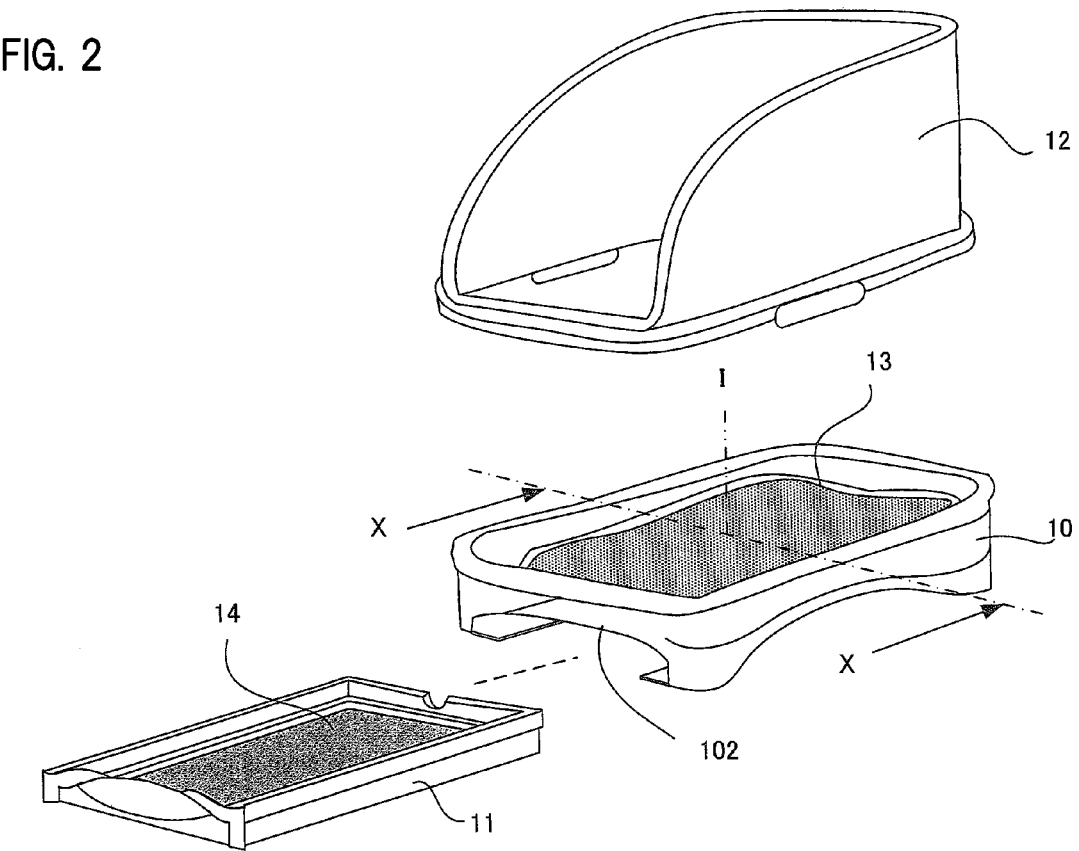
FIG. 2 is a perspective view showing each part of the animal litter box shown in FIG. 1.

An example of an animal litter box using the animal litter manufactured by the above-described method is shown in FIGS. 1 and 2.

As shown in FIGS. 1 and 2, an animal litter box mainly includes a box-like animal litter container 10 for storing animal litter 104 formed as an aggregate of granules, an absorbent sheet container 11 which is arranged under the animal litter container 10 to store an absorbent sheet 14 and can be freely taken in and out, and a side cover 12 which is set on the animal litter container 10 in such a manner as to enclose it. A plurality of holes 102 are formed in a bottom 13 of the animal litter container 10. The holes 102 have a polygonal or circular shape and a size small enough to prevent downward passage of the animal litter 104 and hold it. The animal litter box is used with the animal litter 104 laid on the bottom 13 and with the absorbent sheet 14 laid in the absorbent sheet container 11.

In view of the features of the present invention, the following is further provided:

A method of manufacturing animal litter including an aggregate of granules, comprising at least steps of:

obtaining a granular mixture by mixing and stirring a granular substrate made of inorganic porous material, a hydraulic binder and a soluble thickener while adding water, curing and solidifying the mixture via the binder, and obtaining the granules by drying the solidified mixture, wherein a thickener has a viscosity of about 4,000 mpa·s or more during the stirring.

DESCRIPTION OF NUMERALS 10 animal litter container
13 bottom
102 holes
11 absorbent sheet container
12 side cover
104 animal litter
14 absorbent sheet

What we claim is:

1. A method of manufacturing animal litter including an aggregate of granules, comprising at least a step of forming the granules by mixing a granular substrate made of inorganic porous material, a hydraulic binder and a soluble thickener while adding water.

2. The method as defined in claim 1, comprising a step of obtaining a granular mixture by mixing and stirring the granular substrate, the binder and the thickener while adding water, a step of curing and solidifying the mixture via the binder, and a step of obtaining the granules by drying the solidified mixture.

3. The method as defined in claim 1, wherein the thickener comprises at least one of water-soluble cellulose and modified cellulose.

4. The method as defined in claim 1, wherein the thickener comprises at least one of alkyl cellulose and hydroxyl cellulose.

5. The method as defined in claim 1, wherein the granular substrate comprises a zeolitic material.

6. The method as defined in claim 1, wherein the binder comprises a cementitious binder.

7. The method as defined in claim 1, wherein the weight of each granule is about 0.1 to 0.4 gram.

8. The method as defined in claim 1, wherein the length of each granule is about 5 to 20 mm.

9. The method as defined in claim 1, wherein the diameter of each granule is about 3 to 8 mm.

10. The method as defined in claim 1, wherein a silica gel material is further mixed as a deodorant.

11. The method as defined in claim 1, wherein the surface of the granule is water-repellent.

12. The method as defined in claim 1, wherein the granule contains the binder of about 20% or less by mass and the thickener of about 1% or less by mass.

13. The method as defined in claim 1, wherein the granule includes a granular substrate made of inorganic porous material, a hydraulic binder and a soluble thickener, and has the average granule density from about 0.0010 to 0.0012 g/mm$^3$.

* * * * *